United States Patent
Lee

(10) Patent No.: US 7,604,568 B2
(45) Date of Patent: Oct. 20, 2009

(54) METHOD FOR CONTROLLING 3-2 SHIFT BEFORE STOPPING OF AUTOMATIC TRANSMISSION AND SYSTEM THEREOF

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 399 days.

(21) Appl. No.: 11/642,451

(22) Filed: Dec. 20, 2006

(65) Prior Publication Data

US 2008/0125945 A1     May 29, 2008

(30) Foreign Application Priority Data

Nov. 6, 2006    (KR) ...................... 10-2006-0109090

(51) Int. Cl.
 *B60W 10/02*    (2006.01)
(52) U.S. Cl. ........................ 477/115; 477/98
(58) Field of Classification Search ............ 477/94; 475/117
 See application file for complete search history.

(56) References Cited

U.S. PATENT DOCUMENTS 6,494,808 B2 *  12/2002  Lee ............................ 477/94

FOREIGN PATENT DOCUMENTS

| JP | 2004-100783 | 4/2004 |
|----|---|---|
| KR | 1003137938 B1 | 10/2001 |
| KR | 1020040097766 | 11/2004 |

\* cited by examiner

*Primary Examiner*—Roger L Pang
*Assistant Examiner*—Edwin A. Young
(74) *Attorney, Agent, or Firm*—Morgan, Lewis & Bockius LLP

(57) ABSTRACT

A method and system for controlling a 3→2 shift before stopping of an automatic transmission reduces shift shock as a consequence of an operation of a control duty being delayed according to an angular velocity of an engine at a shift start point in the 3→2 shifting process before stopping. The method includes: detecting driving information; determining whether a 3→2 shift condition before stopping is satisfied; determining, when the 3→2 shift condition before stopping is satisfied, whether a shift control condition is satisfied; and controlling the 3→2 shift before stopping when the shift control condition is satisfied.

10 Claims, 3 Drawing Sheets

METHOD FOR CONTROLLING 3-2 SHIFT BEFORE STOPPING OF AUTOMATIC TRANSMISSION AND SYSTEM THEREOF

CROSS-REFERENCE TO RELATED APPLICATION

This application claims priority to and the benefit of Korean Patent Application No. 10-2006-0109090 filed in the Korean Intellectual Property Office on Nov. 6, 2006, the entire contents of which are incorporated herein by reference.

TECHNICAL FIELD OF THE INVENTION

The present invention relates to a method and system for controlling a 3→2 shift (downshift from third gear to second gear) before stopping of an automatic transmission. More particularly, the method and system has the advantage of reducing shift shock as a consequence of a control duty operation being delayed according to an angular velocity of an engine at a shift start point in the third to second downshifting process before stopping.

BACKGROUND OF THE INVENTION

Generally, an automatic transmission controls hydraulic pressure by operating at least one solenoid valve according to a driving state, such as a vehicle speed or a throttle opening, in order to shift to a target shift speed. In a case that shifting to the target shift speed is performed, an automatic transmission has an off-going element that changes from an engaged state to a released state and an on-coming element that changes from a released state to an engaged state. Releasing an off-going element and engaging an on-coming element is realized by controlling a hydraulic pressure supplied to respective elements. In addition, control of the hydraulic pressure supplied to the off-going and on-coming elements is performed by operating a control duty and controlling the solenoid valve according to the control duty.

Meanwhile, a vehicle frequently changes its state from power-on to power-off or from power-off to power-on as a consequence of electric loads, such as an air conditioner, when a downshift from third gear to second gear is performed before the vehicle stops. Accordingly, a shifting process may be unstable and shift shock may occur.

Generally, a downshift from third to second before stopping is performed in a power-off state. In this case, since an angular velocity of an engine is smaller than an angular velocity of a turbine, shift shock may not occur. However, in a case that an air conditioner is operated, the angular velocity of the engine is larger than the angular velocity of the turbine as a consequence of operation of a relay, and accordingly, the downshift before stopping is performed in a power-on state and shift shock may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides methods and systems for controlling a 3→2 shift (e.g., downshift from third gear to second gear) before stopping of an automatic transmission. Advantages of the present invention include reducing shift shock as a consequence of a control duty operation being delayed according to an angular velocity of an engine at a shift start point in the 3→2 shifting process before stopping.

An exemplary system for controlling a 3→2 shift before stopping of an automatic transmission includes: an engine speed detector for detecting an angular velocity of an engine; a brake switch for detecting whether a brake pedal is operated; a throttle opening detector for detecting a throttle opening; an oil temperature detector for detecting oil temperature in the transmission; and a transmission control unit receiving driving information from each detector and the brake switch. In some embodiments, the transmission control unit is programmed to perform each step of the methods for controlling a 3→2 shift before stopping of an automatic transmission.

Exemplary methods for controlling a 3→2 shift before stopping of an automatic transmission includes: detecting driving information; determining whether a 3→2 shift condition before stopping is satisfied; determining, when the 3→2 shift condition before stopping is satisfied, whether a shift control condition is satisfied; and controlling the 3→2 shift before stopping when the shift control condition is satisfied.

The control of the 3→2 shift before stopping may include determining a delay time and operating a control duty after the delay time has passed since a shift start point. The delay time can also be determined according to an angular velocity of an engine at the shift start point. The delay time according to the angular velocity of the engine at the shift start point can be stored in a map. Driving information may include the angular velocity of the engine, the operation of a brake switch, the throttle opening, and the oil temperature in the transmission. The 3→2 shift condition before stopping can also be satisfied when the brake switch is turned on during a predetermined 3→2 shifting process.

The shift control condition can also be satisfied when the angular velocity of the engine at the shift start point is larger than a predetermined angular velocity, the throttle opening is smaller than a predetermined throttle opening, and the oil temperature of the transmission is within a predetermined temperature range.

DETAILED DESCRIPTION OF THE EMBODIMENT

Figure 1:
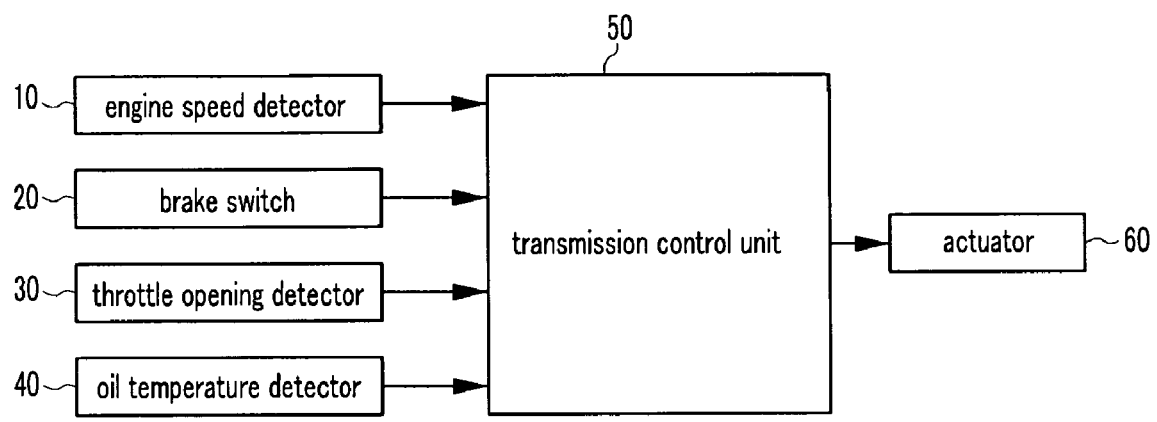
FIG. 1 is a block diagram of a system for controlling a 3→2 shift before stopping of an automatic transmission according to an exemplary embodiment of the present invention.

Referring to FIG. 1, an exemplary system for controlling a 3→2 shift before stopping of an automatic transmission includes an engine speed detector 10, a brake switch 20, a throttle opening detector 30, an oil temperature detector 40, a transmission control unit 50, and an actuator 60. The engine speed detector 10 is mounted on an output shaft of an engine. The engine speed detector 10 detects an angular velocity of the engine and transmits a signal corresponding thereto to the transmission control unit 50. The brake switch 20 is turned on or off according to an operation of a brake pedal. Thus, the brake switch 20 detects whether the brake pedal operates and transmits a signal corresponding thereto to the transmission control unit 50. The throttle opening detector 30 detects an opening of a throttle valve that is operated according to an operation of an acceleration pedal, and transmits a signal corresponding thereto to the transmission control unit 50.

The oil temperature detector 40 detects oil temperature in the transmission and transmits a signal corresponding thereto to the transmission control unit 50. The transmission control unit 50 can be realized by one or more processors activated by a predetermined program, and the predetermined program can be programmed to perform each step of a method for controlling a 3→2 shift before stopping of an automatic transmission according to an embodiment of this invention.

The transmission control unit 50 receives driving information from respective detectors 10, 30, and 40 and the brake switch 20. The transmission control unit 50 determines whether a 3→2 shift condition before stopping is satisfied, and generates a control signal corresponding thereto. In addition, the transmission control unit 50 determines based on the driving information whether a shift control condition is satisfied and generates a control signal corresponding thereto.

In certain embodiments, the driving information can include the angular velocity of the engine, the operation of the brake pedal, the throttle opening, and the oil temperature in the transmission. In addition, the transmission control unit 50 includes a map (e.g. data stored in the transmission control unit 50) where a delay time according to the angular velocity of the engine at a shift start point is stored. The shift start point means the time when the transmission control unit 50 starts the shift control by starting control of a solenoid valve in the automatic transmission.

According to some embodiments, the transmission control unit 50 forcibly delays an operation of a control duty by the delay time. That is, the delay time means a time interval from the shift start point to an operation point of the control duty. The actuator 60 includes at least one solenoid valve. The actuator 60 receives the control signal form the transmission control unit 50 and controls hydraulic pressure applied to respective frictional elements.

Hereinafter, referring to FIG. 2 and FIG. 3, an exemplary method for controlling a 3→2 shift before stopping of an automatic transmission according to an embodiment of the present invention will be described in detail.

Figure 2:
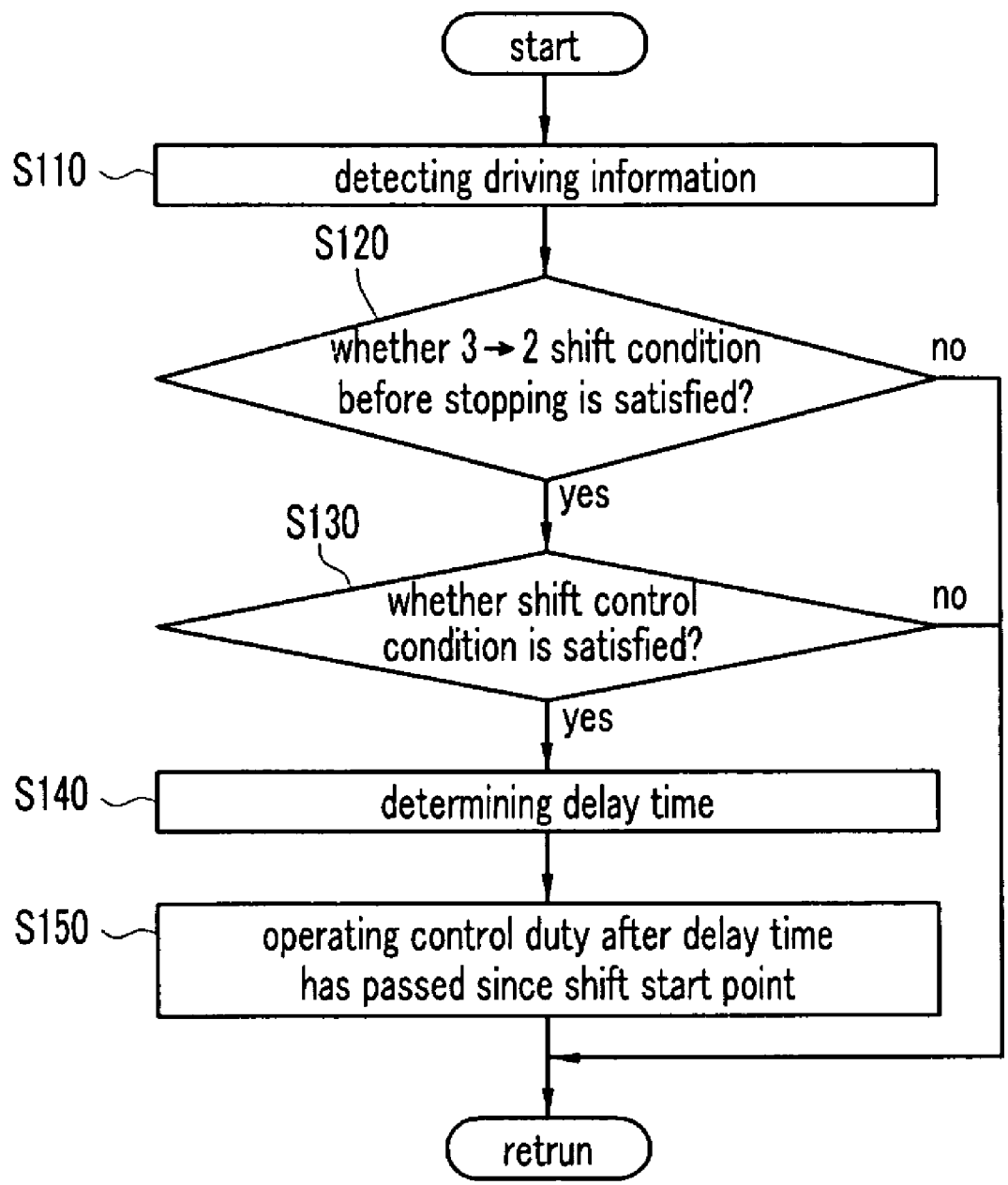
FIG. 2 is a flowchart of a method for controlling a 3→2 shift before stopping of an automatic transmission according to an exemplary embodiment of the present invention.
Figure 3:
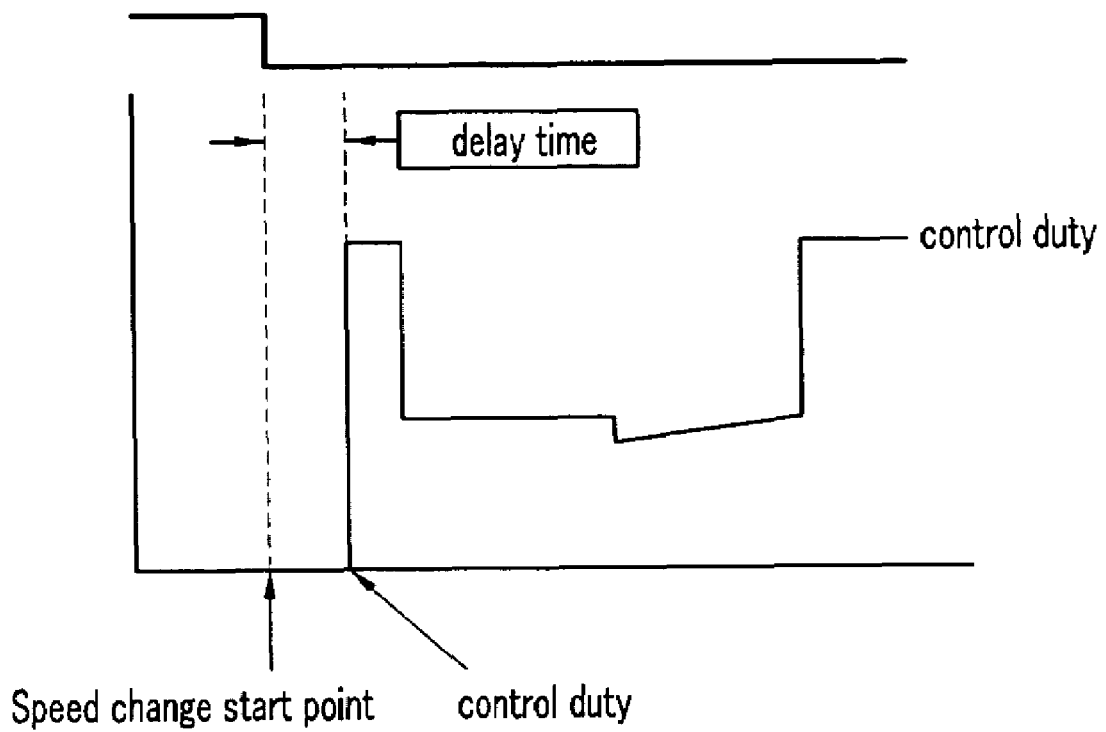
FIG. 3 is a graph showing an operation point of a control duty and a delay time according to an exemplary embodiment of the present invention.

FIG. 2 is a flowchart of a method for controlling a 3→2 shift before stopping of an automatic transmission, and FIG. 3 is a graph showing an operation point of a control duty and a delay time according to an exemplary embodiment of the present invention. According to FIG. 2, in a state that a vehicle is running, the respective detectors 10, 30, and 40 and the brake switch 20 detect the driving information of the vehicle at a step of S110, and transmit the driving information to the transmission control unit 50. That is, the engine speed detector 10 detects the angular velocity of the engine, the brake switch 20 detects operation of the brake pedal, the throttle opening detector 30 detects the throttle opening, and the oil temperature detector 40 detects the oil temperature in the transmission. Next, the transmission control unit 50 determines, based on the driving information, whether the 3→2 shift condition before stopping is satisfied, at step S120.

The 3→2 shift condition before stopping is satisfied when the brake switch 20 is turned on during a predetermined 3→2 shifting process. If the 3→2 shift condition before stopping is not satisfied at the step S120, the method for controlling the 3→2 shift before stopping according to an exemplary embodiment of the present invention is finished. If the 3→2 shift condition before stopping is satisfied at the step S120, the transmission control unit 50 determines, based on the driving information, whether the shift control condition is satisfied at step S130.

The shift control condition is satisfied when the angular velocity of the engine at the shift start point is larger than a predetermined angular velocity, the throttle opening is smaller than a predetermined throttle opening, and the oil temperature of the transmission is within a predetermined temperature range. The predetermined angular velocity, the predetermined throttle opening, and the predetermined temperature range can be easily determined by a person of an ordinary skill in the art. For example, the predetermined angular velocity is 650 rpm, the predetermined throttle opening is 1.25%, and the predetermined temperature range is from 30° C. to 120° C.

If the shift control condition is not satisfied at the step S130, the method for controlling the 3→2 shift before stopping according to an exemplary embodiment of the present invention is finished. If the shift control condition is satisfied at the step S130, the transmission control unit 50 determines the delay time at a step S140. The delay time is determined according to the angular velocity of the engine at the shift start point. In addition, the delay time according to the angular velocity of the engine at the shift start point is stored in the map of the transmission control unit 50.

Table 1 is one example of the map where the delay time according to the angular velocity of the engine is stored at the shift start point

TABLE 1

| | angular velocity of engine (rpm) | | | | |
|---|---|---|---|---|---|
| | 650 | 700 | 750 | 800 | 850 |
| delay time (ms) | 50 | 100 | 150 | 200 | 250 |

Next, as shown in FIG. 3, the transmission control unit 50 operates the control duty after the delay time has passed since the shift start point at a step S150. In addition, the actuator 60 controls, according to the control duty, the hydraulic pressure applied to the respective frictional elements. According to the present invention, the angular velocity of the engine may not be larger than the angular velocity of the turbine since the operation of the control duty is delayed according to the angular velocity of the engine at the shift start point. Therefore, shift shock may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a downshift from a third gear to a second gear before stopping of an automatic transmission, comprising:
   detecting driving information;
   determining whether a downshift from the third gear to the second gear condition before stopping is satisfied;
   determining, when the downshift from the third gear to the second gear condition before stopping is satisfied, whether a shift control condition is satisfied; and
   controlling the downshift from the third gear to the second gear before stopping when the shift control condition is satisfied;

wherein the control of the downshift from the third gear to the second gear before stopping comprises:
determining a delay time; and
operating a control duty after the delay time has passed since a shift start point;
wherein the delay time is determined according to an angular velocity of an engine at the shift start point.

2. The method of claim 1, wherein the delay time according to the angular velocity of the engine at the shift start point is stored in a map.

3. The method of claim 1, wherein the driving information is selected from the group consisting of angular velocity of an engine, operation of a brake switch, a throttle opening, and oil temperature in the transmission.

4. The method of claim 1, wherein the downshift from the third gear to the second gear shift condition before stopping is satisfied when a brake switch is turned on during a predetermined downshifting process from the third gear to the second gear.

5. The method of claim 1, wherein the shift control condition is satisfied when an angular velocity of an engine at a shift start point is larger than a predetermined angular velocity, a throttle opening is smaller than a predetermined throttle opening, and oil temperature of the transmission is within a predetermined temperature range.

6. A system for controlling a downshift from a third gear to a second gear before stopping of an automatic transmission, comprising:
an engine speed detector for detecting an angular velocity of an engine;
a brake switch for detecting operation of a brake pedal;
a throttle opening detector for detecting a throttle opening;
an oil temperature detector for detecting oil temperature in the transmission; and
a transmission control unit receiving driving information from each detector and the brake switch,
wherein the transmission control unit executes a predetermined program comprising instructions for
detecting the driving information,
determining whether a downshift from the third gear to the second gear shift condition before stopping is satisfied,
determining, when the downshift from the third gear to the second gear shift condition before stopping is satisfied, whether a shift control condition is satisfied, and
controlling the downshift from the third gear to the second gear before stopping when the shift control condition is satisfied;
wherein the control of the downshift from the third gear to the second gear before stopping comprises:
determining a delay time; and
operating a control duty after the delay time has passed since a shift start point;
wherein the delay time is determined according to the angular velocity of the engine at the shift start point.

7. The system of claim 6, wherein the delay time according to the angular velocity of the engine at the shift start point is stored in a map.

8. The system of claim 6, wherein the driving information is selected from the group consisting of the angular velocity of the engine, an operation of the brake switch, the throttle opening, and the oil temperature in the transmission.

9. The system of claim 6, wherein the downshift from the third gear to the second gear shift condition before stopping is satisfied when the brake switch is turned on during a predetermined downshifting process from the third gear to the second gear.

10. The system of claim 6, wherein the shift control condition is satisfied when the angular velocity of the engine at a shift start point is larger than a predetermined angular velocity, the throttle opening is smaller than a predetermined throttle opening, and the oil temperature of the transmission is within a predetermined temperature range.

* * * * *